(12) United States Patent
Nielen et al.

(10) Patent No.: US 8,161,039 B2
(45) Date of Patent: Apr. 17, 2012

(54) AUTOMATIC PERSONAL PLAY LIST GENERATION BASED ON EXTERNAL FACTORS SUCH AS WEATHER, FINANCIAL MARKET, MEDIA SALES OR CALENDAR DATA

(75) Inventors: Martinus S. Nielen, Best (NL); Marc Willekens, Tilburg (NL); Alexander Petrus Paulus Vrijsen, Waalre (NL); Stuart Burge, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 710 days.

(21) Appl. No.: 11/815,385

(22) PCT Filed: Feb. 13, 2006

(86) PCT No.: PCT/IB2006/050470
§ 371 (c)(1),
(2), (4) Date: Aug. 2, 2007

(87) PCT Pub. No.: WO2006/087672
PCT Pub. Date: Aug. 24, 2006

(65) Prior Publication Data
US 2008/0189319 A1   Aug. 7, 2008

Related U.S. Application Data

(60) Provisional application No. 60/653,159, filed on Feb. 15, 2005.

(51) Int. Cl.
*G06F 7/00* (2006.01)
*G06F 17/30* (2006.01)

(52) U.S. Cl. ......... 707/723; 707/731; 707/733; 707/916
(58) Field of Classification Search ................. 707/731, 707/723, 916, 733
See application file for complete search history.

(56) References Cited

U.S. PATENT DOCUMENTS

| | | | |
|---|---|---|---|
| 6,477,704 B1 | 11/2002 | Cremia | |
| 2003/0182315 A1 | 9/2003 | Plastina et al. | |
| 2004/0003706 A1 | 1/2004 | Tagawa et al. | |
| 2005/0039206 A1* | 2/2005 | Opdycke | 725/35 |
| 2006/0167576 A1* | 7/2006 | Rosenberg | 700/94 |
| 2007/0073596 A1* | 3/2007 | Alexander et al. | 705/26 |
| 2007/0098351 A1* | 5/2007 | East et al. | 386/46 |

OTHER PUBLICATIONS

Punit K. Gupta, www.cc.gatech.edu/~punit/files/newmusic_report1.doc.

* cited by examiner

*Primary Examiner* — Angela Lie
*Assistant Examiner* — Kris Mackes

(57) ABSTRACT

A play list of songs or other media items is automatically generated (380) based on external factors (314, 324, 334) such as weather conditions, stock market conditions, sales of songs, or calendar data, e.g., day of week, holidays or user designated dates such as birthdays, anniversaries and the like. External data (310, 320, 330) relating to the external factors can be received (115) from a radio broadcast, Internet link, or link to a vehicle computer, for instance. The external data is mapped (360) to media items to obtain matching media items (370) for the play list. The mapping may also account for user preferences (145). The user may select (305) the external factor, which represents the mood and/or current preferences of the user in a much better way than the conventional criteria such as genre, artist or album alone.

18 Claims, 3 Drawing Sheets

AUTOMATIC PERSONAL PLAY LIST GENERATION BASED ON EXTERNAL FACTORS SUCH AS WEATHER, FINANCIAL MARKET, MEDIA SALES OR CALENDAR DATA

The invention relates generally to generating a play list, such as lists of songs for play back on a media player such as a CD player, MP3 player or the like, and more particularly to a method and system for automatically generating such a play list based on external factors.

Various types of media players are now available to consumers and other users. For example, portable digital music players, such as MP3 players, and personal computers (PCs) allow the storage of numerous songs in digital format. Moreover, home entertainment systems are also media players that allow the user to access content via cable and satellite television networks, computer networks such as the Internet, and via local storage such as movies stored on digital versatile disks (DVDs). For example, electronic program guides allow the user to select from available television broadcast programs. Broadcast of radio programs, such as talk shows, and music, via satellite to car and home receivers in a digital format is also gaining in popularity.

For instance, the Nexperia™ Personal Media Player from Philips Corp. provides a reference design for mobile device manufacturers. It offers high-resolution video recording and playback as well as connectivity to PCs and home entertainment systems. Personal media players based on the design allow consumers to connect, wired or wirelessly, to their PCs and home entertainment appliances to record and store high-quality digital audio and video and then watch movies, listen to music and view photos on the move. The media player offers compatibility with a variety of audio and video standards, including MP3, AAC, Dolby® Digital, MPEG-2, MPEG-4, and DivX®.

Due to the proliferation of available content, the current media players typically assist the user in making selections among media items (e.g., songs, or television or radio programs) by providing recommendations and generating a play list of programs. For example, user preferences may be developed by providing a user interface that asks a user to identify the type of music, for instance, in which he or she is interested. Or, the media player may employ logic that tracks a user's selections over time to learn what type of content he or she is interested in. The media player can then recommend content in the play list. For instance, a portable media player may automatically generate a play list of songs, and display information such as the title and artist on a display of the media player.

While most media players offer the feature of automatic play list generation, this is generally limited to the specific meta data such as genre, artist and album, or other song characteristics. In particular, available solutions do not take into account other types of data that can be used to generate a play list that provides a more enjoyable and interesting experience for the user, and is customized based on criteria of special interest to the user.

The present invention addresses the above and other issues by providing a method and system for automatically generating a play list based on external factors such as weather conditions, stock market conditions, sales of songs, or calendar data, e.g., day of week, holidays or user designated dates such as birthdays, anniversaries and the like. The invention maps the external data to available media items such as songs to select matching media items for a play list. The user selects the external factor, which represents the mood and/or current preferences of the user in a much better way than the conventional criteria such as genre, artist or album alone. The personal play list can be generated once per specific period based on the external factor.

In particular, in one aspect of the invention, a method for generating a play list of media items for a media player includes mapping at least one external factor to a plurality of media items to select at least one of the plurality of media items as at least one matching media item, and generating a play list comprising the at least one matching media item.

A corresponding media player apparatus and program storages device may also be provided.

In the drawings:

In all the Figures, corresponding parts are referenced by the same reference numerals.

The present invention can be used in any type of media player that automatically generates a play list of media items that are to be played by the system. Examples of media players include hard disk device (HDD) music players, set-top boxes, home media players, personal computers, portable MP3 players, vehicle based systems, and the like. The play list conventionally attempts to provide a list of media items (e.g., songs, lectures, TV programs, slides in a slide show) that are interrelated. The songs may refer to similar artists or genres or may make use of user preferences that are stored by the media player. Moreover, electronic program guides (EPG) are commonly used to determine which programs are scheduled for broadcast. A play list thus can be created for an evening's worth of TV viewing, for instance, by selecting programs from the EPG. Many media players also provide for recording of the broadcast programs for subsequent play back at any time.

Figure 1:
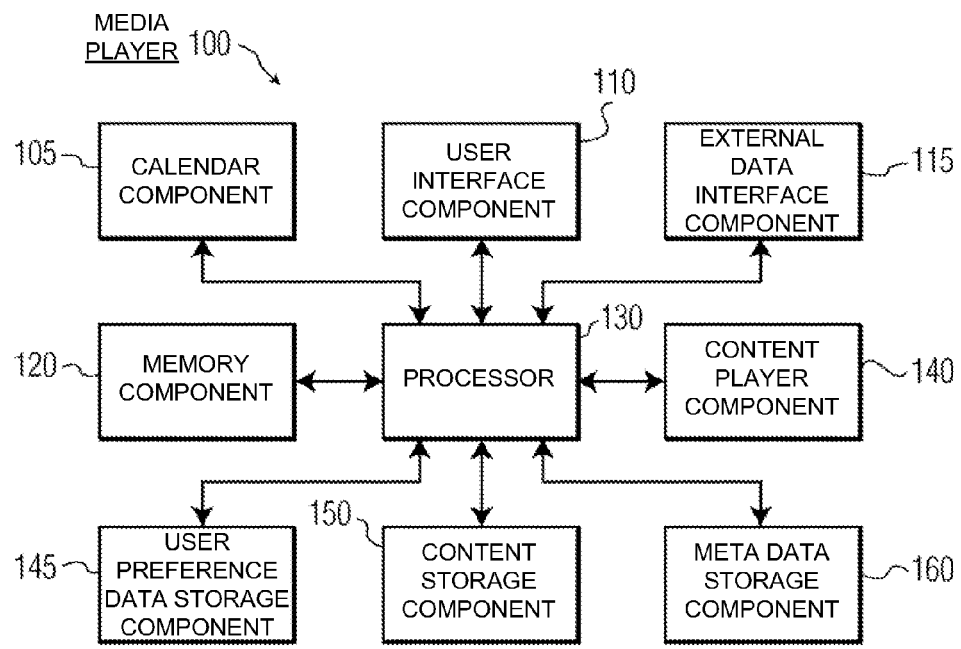
FIG. 1 illustrates a block diagram of a media player, according to the invention.

FIG. 1 illustrates a block diagram of an example media player. In FIG. 1, block 105 reads "calendar", block 110 reads "user interface", block 115 reads "external data interface", block 120 reads "memory", block 130 reads "processor", block 140 reads "content player", block 145 reads "user preferences", block 150 reads "content storage", and block 160 reads "meta data". The media player 100 includes a processor 130 and a memory 120. The memory 120 may store instructions, such as software, micro-code or firmware, which are executed by the processor 130 to achieve the functionality described herein. The memory 120 may thus be considered a program storage device that tangibly embodies the executable instructions. Such a program storage device can be built into the media player or provided as a removable media, such as a CDROM or portable USB flash memory. The user preferences block 145 represents user preference data that is maintained by the media player for one or more users. This data can indicate that the user likes a certain genre of music, for instance. Content storage 150 represents a storage resource for storing a database of media items, including audio content (e.g., songs, lectures), video content (e.g., digital photos) and audio/video content (e.g., movies). The content storage 150 can be a hard disk drive, flash memory, or any other memory resource. A content player 140 may be an audio and/or video player that processes the content from the content storage 150 (e.g., by performing decompression and decoding, for example) to provide an appropriate output signal, such as to a display or audio amplifier. A user interface 110 may provide a display, e.g., an LCD screen, or possibly a voice/audio interface, that allows a user to enter commands.

A meta data block 160 indicates meta data that is stored for the media items in the content storage 150. The meta data can optionally be stored with the media items themselves as well. The meta data can include information such as genre, artist and album title, song characteristics such as tempo and beats per minute, keywords and lyrics. The meta data can also indicate whether a media item is expected to be popular with certain users based on demographic factors such as age, gender and so forth. The meta data of songs can be obtained from various sources. For example, audio fingerprinting technology available from Philips Corporation, and access to a database such as Gracenote Corporation's CDDB® database (Emeryville, Calif.), may be used. Moreover, the meta data can be based on the ID3 tagging used for MP3 songs, or on similar mechanisms for AAC songs or other song formats. Note that the ID3 tags can be extended with additional information as needed.

A calendar function 105, which may be similar to time and date keeping components used by VCRs and DVD players, for instance, maintains date information, such as day of week, e.g., Monday, Tuesday, etc., month, date and year and optionally, time of day. The calendar 105 can be pre-programmed with dates of general interest such as holidays, dates with a full moon, and the like. Furthermore, the user interface 110 may enable the user to designate special dates such as birthdays and anniversaries of family members and friends.

An external data interface 115 receives external data from an external data source such as a communication network, e.g., a wireless network or the Internet. As an example, an RF radio signal may be broadcast which includes the external data. Generally, the external data represents an external factor, e.g., a factor or condition that is external to, or not inherently related to, the media player or the media items. Such a factor can include weather conditions, e.g., sunny, cloudy, rainy, stormy, windy, outside temperature, etc., financial market conditions, such as stock market data, e.g., a market average such as the Dow Jones Industrial Average (DJIA) or the S&P 500, or the price of specific stocks, or sales data for different songs, e.g., the Billboard Top 40 Tracks™. The calendar data, such as day of week is also considered to be an external factor. However, calendar data can be maintained locally by the calendar function 105. Optionally, the calendar data is received from an external source via the interface 115.

Figure 2:
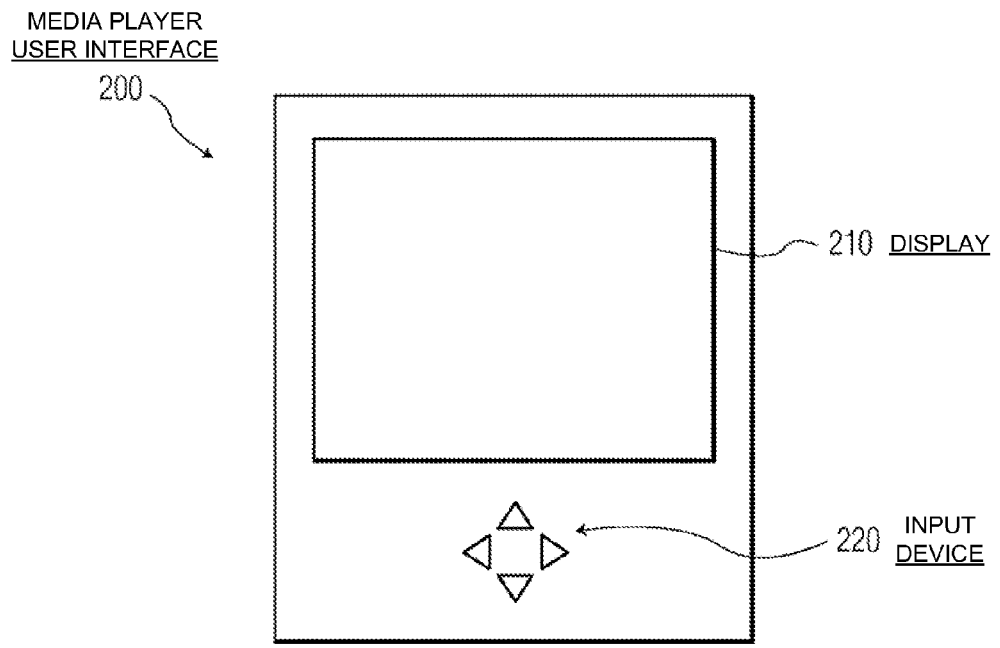
FIG. 2 illustrates an example media player user interface, according to the invention.

FIG. 2 illustrates an example media player user interface, according to the invention. The example user interface 200 includes a display 210 for displaying a play list. In one possibility, the media player interface 200 is a self-contained media player such as a portable media player. It is also possible for the media player interface 200 to be provided in a device such as a handheld remote control that is used to communicate with other components in a home media player. For example, the display 210 may be in a TV remote control for providing a play list of TV programs. Additional buttons may be provided for controlling the TV, or the buttons may be generated on the display 210 as touch screen buttons. In another example, the media player interface 200 is a remote control for a CD player, and the display 210 provides a play list of songs available from a CD library. In another example, the media player interface 200 is part of a digital camera, and the display 210 provides a play list of images stored in the camera. Various other possibilities will be apparent to those skilled in the art. The media player interface 200 includes an input device 220 such as arrow-shaped buttons that allow the user to enter commands and view the play list. The particular arrangement shown is an example only, as other arrangements are possible. Other interface mechanisms such as voice/audio interface can also be used. Or, the display 210 may be a touch screen that allows a user to enter commands by touch.

Figure 3:
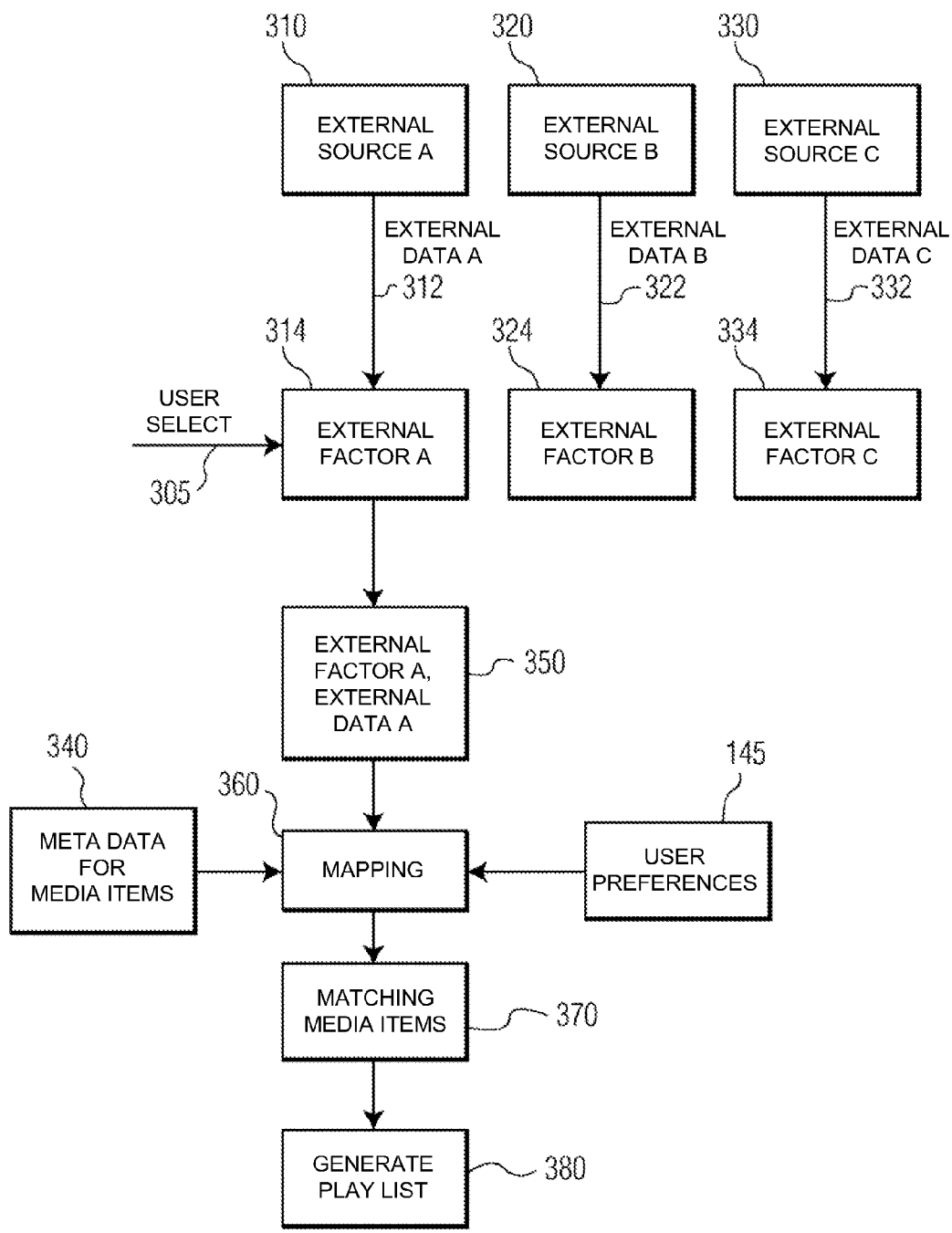
FIG. 3 illustrates mapping of external factors to media items to select a matching media item, according to the invention.

FIG. 3 illustrates mapping of external factors to media items to select a matching media item, according to the invention. In FIG. 3, arrow 305 reads "user select", block 310 reads "external source A", arrow 312 reads "external data A", block 314 reads "external factor A", block 320 reads "external source B", arrow 322 reads "external data B", block 324 reads "external factor B", block 330 reads "external source C", block 332 reads "external data C", block 334 reads "external factor C", block 340 reads "meta data for media items", block 350 reads "external factor A, external data A", block 360 reads "mapping", block 370 reads "matching media items", block 380 reads "generate play list" and block 145 reads "user preferences." Generally, the media player may allow the user to choose, via the user interface 110, from among one or more external factors for generating a play list. The external factor can be selected by the user based on the user's current mood or interests, for example. In one possible approach, the selected external factor is recorded for subsequent use in generating a play list. Or, the media player may immediately generate or modify a play list.

As an example, the user may choose one of the three external factors represented by blocks 314, 324 and 334. External factor A (block 314) may represent weather conditions, while external factor B (block 324) represents stock market conditions, and external factor C (block 334) represents sales conditions. Furthermore, data relating to the external factors can be received from one or more external sources, such as the Internet or a radio broadcast, one example of which is the Radio Data Service (RDS), which transmits data on the FM waveband. In one possible approach, a media player in a vehicle may communicate with systems in the vehicle to obtain the data relating to the external factors. For instance, the external data interface 115 may receive the current temperature from a temperature sensor in the car, or ascertain that it is raining if the windshield wipers are operating, or if a rain sensor that controls the wipers senses rain. The external data interface 115 may communicate with a computer in the vehicle that monitors the sensors, for instance.

Sales data, such as for songs, is typically available from music industry sources such as Billboard on a weekly basis, and can be communicated to the external data interface 115 as well. The sales data can identify the top songs in different genres, e.g., jazz, popular, etc.

The external sources of data, 310, 320 and 330, can be different sources or provided by one source. The external sources 310, 320 and 330 communicate their respective external data via communication paths 312, 322 and 332, which can be different paths or one path, for use by the respective external factors 314, 324 and 334. Assuming the user selects external factor A (block 314), the external factor A and the external data A (block 350) are mapped by a mapping function 360 to the media items (block 340) to determine one or more matching media items (block 370) for generating a play list (block 380). For example, the external data can be converted to meta data for creating the matching criteria for the meta data of the media items. The mapping 360 may also be responsive to the user preferences 145 in determining the matching media items. The invention thus can provide a mapping between external data and the standard meta data used for the automatic play list generation. The standard meta data typically includes the song title, artists, keywords, and lyrics of the song. However, meta data is not required, as various algorithms may be used to find songs that are similar to a song that represents an external factor, such as a weather condition. For instance, a reflective song can be associated with a rainy day.

For example, when the external factor relates to weather conditions, and the external data indicates the temperature is very cold, the song "Baby, it's cold outside" may be selected as a matching media item for the play list. Or, when the external data indicates the temperature is hot, the song "Hot, hot, hot" may be selected as a matching media item. Or, when the external data indicates it is rainy, the song "Singin' in the rain" may be selected as a matching media item for the play list. As an example of using the user preferences 145, the age and gender of the user may be used to select one of a number of different songs that are potential matches. For example, a song recorded many years ago may appeal to older users, while a modem version of the same song may appeal to younger users. Moreover, one user may prefer the genre of songs from old movies, such as "Singin' in the rain", while another user prefers the Motown genre of "I wish it would rain" by The Temptations. Various other examples will be apparent to those skilled in the art.

When the external factor relates to stock prices, the external data can include prices of individual stocks, market averages, and the like. Moreover, prices can be aggregated for a user-designated collection of stocks. Songs can be selected based on specific keywords such as "Wall street", "NASDAQ", "index" "exchange", "money", "cash", and so forth. Example songs include "The Wall Street shuffle" and "Money". Another option is for the user to set a trigger or target level, e.g., when the DJIA index increases above 11,000 points, the song "We're in the money" or other upbeat music can be selected for the play list. Similarly, a sad song can be selected when stock prices drop below a certain target level. In one possible approach, the media play can react to changes in stock prices over relatively long periods of time, e.g., weeks or months.

When the external factor relates to sales of songs, the external data can include identifiers of top selling songs in different genres, for example. This data can be filtered according to the user preferences 145. The external data for each song can include an identifier that can be matched with the identifiers of the media items stored locally in the media player to generate a play list. Or, the titles can be matched. The meta data of the stored songs combined with the external data received from the music industry therefore allows the media player to generate a play list of the top songs in a given category.

Note that a new play list can be generated where each media item is based on the external factor and external data. For example, all songs on the play list can relate to rain when the external factor is weather and the external data indicates it is raining. Or, a predetermined portion of the play list, e.g., half of the songs, can be based on the external factor and external data, while the other half are conventionally generated. Furthermore, an existing play list can be modified to include the songs related to the external factor and external data by replacing some of the media items on the existing play list. Thus, both all new and modified play lists can be generated. Note also that the generated play lists can be saved and re-used later by the user. Furthermore, a play list can be updated from time to time as changes in the external factors are detected. Or, the play list can be fixed once generated even when changes in the external factors are detected by the media player.

Figure 4:
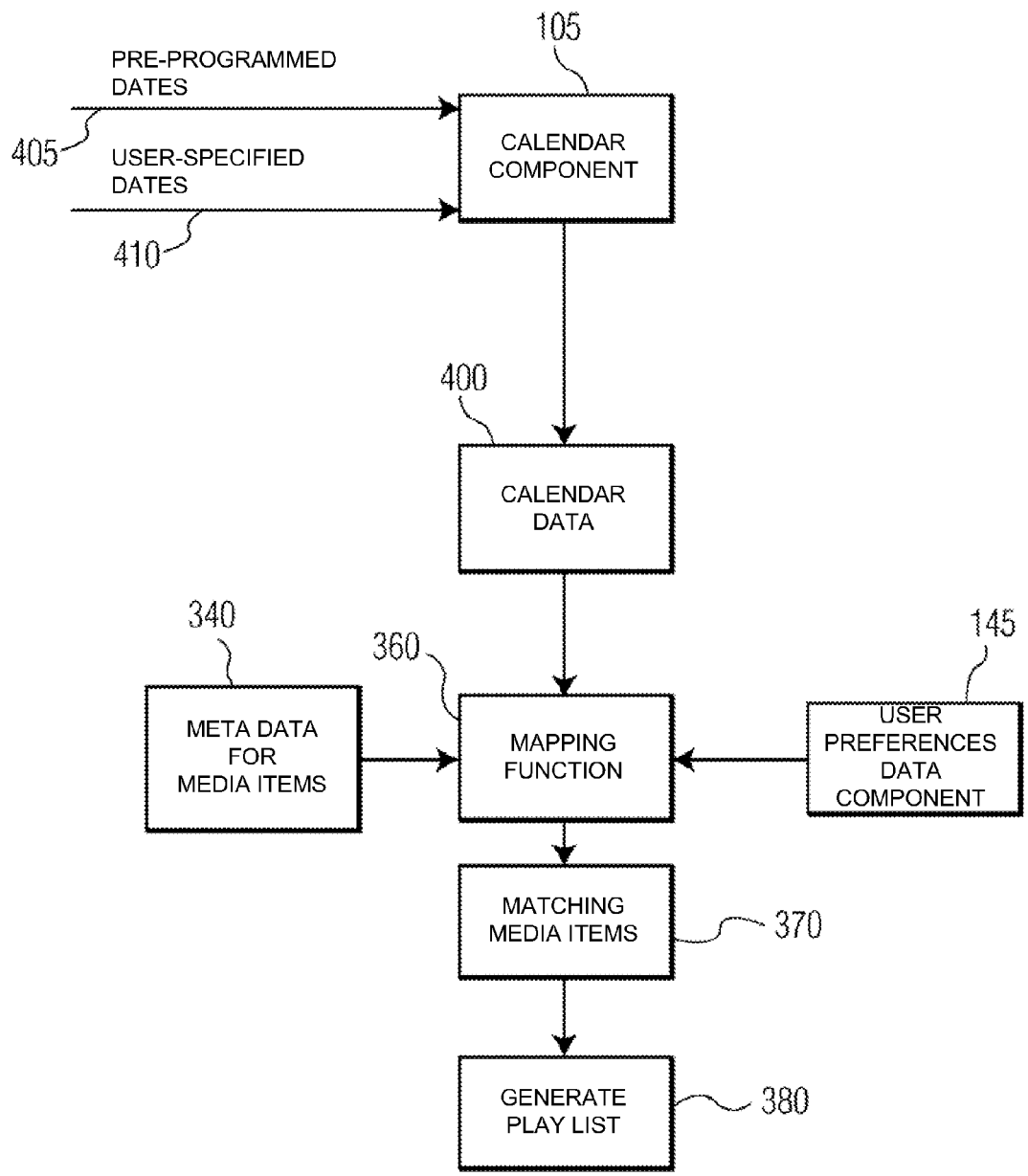
FIG. 4 illustrates mapping of calendar data to media items to select a matching media item, according to the invention.

FIG. 4 illustrates mapping of calendar data to media items to select a matching media item, according to the invention. In FIG. 4, arrow 405 reads "pre-programmed dates", arrow 410 reads "user-specified dates", block 105 reads "calendar", block 105 reads "calendar data", block 340 reads "meta data for media items", block 145 reads "user preferences", block 360 reads "mapping", block 370 reads "matching media items", and block 380 reads "generate play list." The calendar 105 has an internal clock to track the time and date. Pre-programmed dates (arrow 405) may be provided to indicate dates of general interest, such as holidays, elections, and dates when there is a full moon, eclipse or other astronomical event of interest. Moreover, user-specified dates (arrow 410) can be entered by the user. These can be birthdays, anniversaries, vacation dates, dates of sports events of interest, dates for appointments, and so forth. When the calendar ascertains that a date of interest has been reached, it provides calendar data (block 400) that is mapped by the mapping function 360 to meta data of the media items (block 340) to determine one or more matching media items (block 370) for generating a play list (block 380). For example, Christmas songs may be selected when the date is on or close to the pre-programmed date of Christmas. Other seasonal songs can be selected based on the season, e.g., Spring, Summer, Fall or Winter. As a further example, the song "Happy Birthday to you" or "Birthday" may be selected on the date of a birthday that is specified by the user. As a further example, the song "Monday, Monday" can be selected for a play list on Mondays. Songs can be selected based on their meta data using specific keywords such as Christmas, Monday, weekend, Friday, summer, and so forth. In another example, the song "Moondance" can be selected on the date of a full moon. Moreover, time data can be used so that the song is selected at night.

Furthermore, the time of day may be used as an external factor such that play lists generated in the morning are different than those generated at night. The calendar function 105 or a separate clock may provide time of day data.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but should be construed to cover all modifications that may fall within the scope of the appended claims.

The invention claimed is:

1. A method for generating a play list of media items for playback on a media player, the method comprising:

mapping, via a processor and memory, between at least one external factor and standard meta data for a plurality of available media items according to a mapping function, wherein the at least one external factor (i) represents a user selected preference of external factor selected among one or more external factors for generating or modifying the playlist based on a user's current mood or interests and (ii) comprises a factor or condition that is (ii)(a) external and (ii)(b) not inherently related to the media player and (ii)(c) not inherently related to the available media items, wherein the mapping function enables selection of at least one of the plurality of available media items that are potential matches as at least one matching media item for a play list to be generated in response to (I) the at least one external factor and (II) receipt of external data corresponding to the at least one external factor, wherein the standard meta data includes song titles, artists, keywords, and lyrics of a song;

receiving external data from at least one external source, wherein the received external data relates to the at least one external factor, further wherein the mapping according to the mapping function is responsive to (i) the received external data and (ii) a user preference filter that includes one of a trigger level, a target level, and a user-specified date for (iii) mapping between the external data and the standard meta data to select the at least one of the plurality of available media items as the at least one matching media item; and generating, via the processor and memory, the play list comprising the selected at least one matching media item.

2. The method of claim 1, wherein:
the mapping, via the processor and memory, is initiated responsive to a user selecting, via a user interface, the at least one external factor.

3. The method of claim 1, wherein:
the mapping, via the processor and memory, is initiated responsive to a user selecting, via a user interface, the at least one external factor from among a plurality of available external factors.

4. The method of claim 1, wherein:
the at least one external factor comprises a weather condition.

5. The method of claim 1, wherein:
the at least one external factor comprises a financial market condition.

6. The method of claim 1, wherein:
the at least one external factor comprises sales data for the media items.

7. The method of claim 1, wherein:
the at least one external factor comprises calendar data.

8. The method of claim 7, wherein:
the calendar data comprises a day of the week.

9. The method of claim 7, wherein:
the calendar data comprises a season.

10. The method of claim 7, wherein:
the calendar data comprises a holiday.

11. The method of claim 7, wherein:
the calendar data comprises a special date designated by a user via a user interface.

12. The method of claim 1, wherein:
the at least one external factor comprises a time of day.

13. The method of claim 1, wherein:
the play list is fixed once generated via the processor and memory even when subsequent occurring changes in the at least one external factor are detected by the media player.

14. The method of claim 1, wherein:
the generated play list is updated via the processor and memory when subsequent occurring changes in the at least one external factor are detected by the media player.

15. The method of claim 1, wherein:
the mapping via the processor and memory uses meta data associated with the plurality of media items.

16. The method of claim 1, wherein:
the mapping via the processor and memory is responsive to user preferences input via a user interface.

17. A media player, comprising:
a user interface for receiving a user command, wherein the user command is configured for selecting at least one external factor, wherein the at least one external factor (a) represents a user selected preference of external factor selected among one or more external factors for generating or modifying the playlist based on a user's current mood or interests and (b) comprises a factor or condition that is (b)(i) external and (b)(ii) not inherently related to the media player and (b)(iii) not inherently related to available media items for playback on the media player;

at least one processor, responsive to the user command, for mapping between the at least one external factor and standard meta data for a plurality of available media items according to a mapping function, wherein the mapping function enables selection of at least one of the plurality of available media items that are potential matches as at least one matching media item for a play list to be generated in response to (I) the at least one external factor and (II) receipt of external data corresponding to the at least one external factor, wherein the standard meta data includes song titles, artists, keywords, and lyrics of a song; and an external data interface for receiving external data from at least one external source, wherein the received external data relates to the at least one external factor, further wherein the mapping according to the mapping function is responsive to (i) the received external data and (ii) a user preference filter that includes one of a trigger level, a target level, and a user-specified data for (iii) mapping between the external data and the standard meta data to select the at least one of the plurality of available media items as the at least one matching media item, and wherein the at least one processor is further for generating the play list comprising the selected at least one matching media item.

18. At least one program storage device tangibly embodying instructions that are executable by at least one processor for performing a method for generating a play list of media items for playback on a media player, the method comprising:

mapping between at least one external factor and standard meta data for a plurality of available media items according to a mapping function, wherein the at least one external factor (i) represents a user selected preference of external factor selected among one or more external factors for generating or modifying the playlist based on a user's current mood or interests and (ii) comprises a factor or condition that is (ii)(a) external and (ii)(b) not inherently related to the media player and (ii)(c) not inherently related to the available media items, wherein the mapping function enables selection of at least one of the plurality of available media items that are potential matches as at least one matching media item for a play list to be generated in response to (I) the at least one external factor and (II) receipt of external data corresponding to the at least one external factor, wherein the standard meta data includes song titles, artists, keywords, and lyrics of a song;

receiving external data from at least one external source, wherein the received external data relates to the at least one external factor, further wherein the mapping according to the mapping function is responsive to (i) the received external data and (ii) a user preference filter that includes one of a trigger level, a target level, and a user-specified date for (iii) mapping between the external data and the standard meta data to select the at least one of the plurality of available media items as the at least one matching media item; and generating the play list comprising the selected at least one matching media item.

* * * * *